(12) United States Patent
Andersen et al.

(10) Patent No.: US 6,540,246 B2
(45) Date of Patent: Apr. 1, 2003

(54) RANCH HITCH ADAPTER

(76) Inventors: John I. Andersen, 2660 Barbara Ave., Idaho Falls, ID (US) 83404; Rick Koster, 8895 N. 15 E., Idaho Falls, ID (US) 83401

( * ) Notice: Subject to any disclaimer, the term of this patent is extended or adjusted under 35 U.S.C. 154(b) by 0 days.

(21) Appl. No.: 09/932,861

(22) Filed: Aug. 17, 2001

(65) Prior Publication Data

US 2002/0060442 A1 May 23, 2002

Related U.S. Application Data

(60) Provisional application No. 60/252,178, filed on Nov. 21, 2000.

(51) Int. Cl.$^7$ ................................................. B60D 1/07
(52) U.S. Cl. ................................. 280/417.1; 280/416.1
(58) Field of Search .................... 280/415.1, 416.1, 280/417.1, 511, 513, 906

(56) References Cited

U.S. PATENT DOCUMENTS

| | | | | |
|---|---|---|---|---|
| 4,576,395 A | * | 3/1986 | Longoria | 224/520 |
| 5,868,415 A | * | 2/1999 | Van Vleet | 280/483 |
| 6,024,372 A | * | 2/2000 | Colibert et al. | 280/416.1 |
| 6,050,588 A | * | 4/2000 | Kissack | 280/434 |
| 6,199,891 B1 | * | 3/2001 | Bell et al. | 280/432 |
| 6,234,509 B1 | * | 5/2001 | Lara | 280/425.2 |
| 6,264,229 B1 | * | 7/2001 | Gill et al. | 280/441.2 |

* cited by examiner

Primary Examiner—Lesley D. Morris
Assistant Examiner—L. Lum
(74) Attorney, Agent, or Firm—David B. Tingey; Dale E. Hulse

(57) ABSTRACT

A hitch adapter for coupling a first vehicle having a king pin mounted thereon to a standard ball hitch. The adapter comprises a vertically adjustable body and a remotely operated latching mechanism. The adapter may have a cone-shaped top with a serrated edge for securely attaching the adapter to a king pin box. The adapter further comprises a bell-shaped opening for receiving the ball hitch, the bell-shaped opening being larger than the ball hitch. The invention further comprises a method of coupling a first vehicle with a king pin and king pin box mounted thereon to a second vehicle with a ball hitch. A hitch adapter kit is also disclosed.

37 Claims, 4 Drawing Sheets

RANCH HITCH ADAPTER

This application claims the benefit of Ser. No. 60/252,178, filed Nov. 21, 2000.

BACKGROUND OF THE INVENTION

1. Field of the Invention

The current invention relates to an apparatus for connecting a motor vehicle to a trailer. Specifically, this invention relates to an apparatus which allows the user to couple a standard fifth-wheel trailer to a standard ball hitch on a motor vehicle.

2. State of the Art

Trailers, including cargo trailers, boat trailers, recreational vehicles, animal trailers, camping trailers and mobile homes, are designed to be towed behind a motor vehicle. During transport, the front end of the trailer is supported by and connected to the vehicle by an apparatus. A truck having a bed, with a connecting apparatus in the bed of the truck, is commonly used to tow trailers. A fifth-wheel trailer connects to a towing vehicle by a fifth-wheel hitch that is mounted on a frame within the vehicle bed such that the actual connecting apparatus is located above the plane of the truck bed. A gooseneck trailer connects directly to the towing vehicle via a ball hitch in the bed of the truck.

While trailer hitches are well known, numerous design drawbacks exist in the prior art. The fifth-wheel trailer connects to the hitch via the trailer's king pin box, which is located on the front end of the trailer. Fifth-wheel trailers commonly extend over at least a portion of the bed of the truck and attach to a hitch near the middle of the truck bed. Standard hitches are very costly, are difficult to install, and often require drilling of holes or other modifications to the truck bed and frame. The hitches are very heavy and very difficult to remove. The complex installation results in the hitch being semi-permanently attached to the towing vehicle, making removal of a standard hitch an arduous task. Therefore, a person who owns both a gooseneck trailer and a fifth-wheel trailer must necessarily own two different trailer hitches and a different trailer hitch must be installed, and/or removed, each time a different trailer is needed. Thus, it would be preferable to have a trailer hitch that was easy to install and remove.

Similarly, the prior art design is unsatisfactory because the hitch generally takes up considerable space in the bed of a truck, causing the bed area to be unusable. Because the standard hitch is typically semi-permanently installed, the valuable cargo space in the truck bed is unavailable even when a trailer is not coupled to the truck. Another limitation of the prior art is that it is difficult to mate the trailer to the coupling apparatus, further prolonging the installation process. Additionally, with the prior art design, a user must climb into the bed of the truck to lock or unlock the coupling apparatus. Finally, standard trailer hitches do not allow vertical adjustment to provide greater or lesser clearance between the side-boards of the bed of the truck and the trailer overshot.

Thus, it would be advantageous to provide a hitch adapter which allows the user to couple a standard fifth-wheel trailer to a standard ball hitch. Further, it would be advantageous to provide a hitch that is easy to install and remove and that permits vertical adjustment of the trailer.

BRIEF SUMMARY OF THE INVENTION

One embodiment of the present invention comprises a hitch adapter for coupling a first vehicle, having a king pin and king pin box, to a second vehicle with a ball hitch, wherein the adapter is easy to install. The hitch adapter includes a threaded collar assembly for attaching to the king pin, a vertically adjustable body including a top with an internal threaded section, wherein the internal threaded section is configured to mate with the threaded collar assembly, and a bottom having a bell-shaped opening for receiving the ball hitch, the bell-shaped opening being larger than the ball hitch, and a latching mechanism coupled to the vertically adjustable body, the latching mechanism being operated by a handle located remote from the hitch.

In a preferred embodiment, the latching mechanism comprises a latch pin configured to ride against a shoulder of a ball hitch, a positive wedge block for securing the latch pin against the shoulder of the ball hitch and for preventing the latch pin from disengaging from the ball hitch, two opposing side plates attached to the bottom of the vertically adjustable body on either side of the latch pin and the wedge block, a backup plate attached to the two opposing side plates, the backup plate for securing the wedge block against the latch pin, and a linear cable actuator housing a cable, the cable being attached at one end thereof to the wedge block and at the other end thereof to a handle, the handle for activating and releasing the latching mechanism wherein the handle is located remote from the bottom of the vertically adjustable body.

Another embodiment of the invention comprises a method of coupling a first vehicle with a king pin and king pin box mounted thereon to a second vehicle with a ball hitch. The method comprises attaching a threaded collar assembly to a king pin, screwing a vertically adjustable body onto the threaded collar assembly, wherein the vertically adjustable body comprises a first end having a slightly serrated top that grips the king pin box and an internal threaded section, and a second end having a bell-shaped opening for receiving the ball hitch, adjusting the vertically adjustable body to a height, aligning the bell-shaped opening within about two inches of the center of the ball hitch, coupling the vertically adjustable body to the ball hitch, and remotely activating a latching mechanism.

In a preferred embodiment, the vertically adjustable body allows a user to level the first vehicle for improved towing characteristics.

Another embodiment of the present invention comprises a hitch adapter for coupling any king pin to a ball hitch. The hitch adapter comprises a threaded collar assembly for attaching to the king pin, a vertically adjustable stem including a first end with an internal threaded section and a top, wherein the internal threaded section is configured to mate with the threaded collar assembly and the top is cone-shaped, slightly serrated and heat treated, and a second end having a bell-shaped opening for receiving the ball hitch, the bell-shaped opening being slightly larger than the ball hitch, and a latching mechanism attached to the vertically adjustable stem, the latching mechanism being operated by a handle located proximate the king pin.

Another embodiment of the present invention includes a ranch hitch adapter kit comprising a hitch adapter, including a threaded collar assembly for attaching to a king pin, a vertically adjustable body having a bell-shaped opening for receiving the ball hitch, the bell-shaped opening being larger than the ball hitch, and a latching mechanism coupled to the vertically adjustable body, the latching mechanism comprising a linear cable actuator housing a cable, the cable being attached at one end thereof to a handle, the handle for activating and releasing the latching mechanism, and a cable

DETAILED DESCRIPTION OF THE INVENTION

Figure 1:
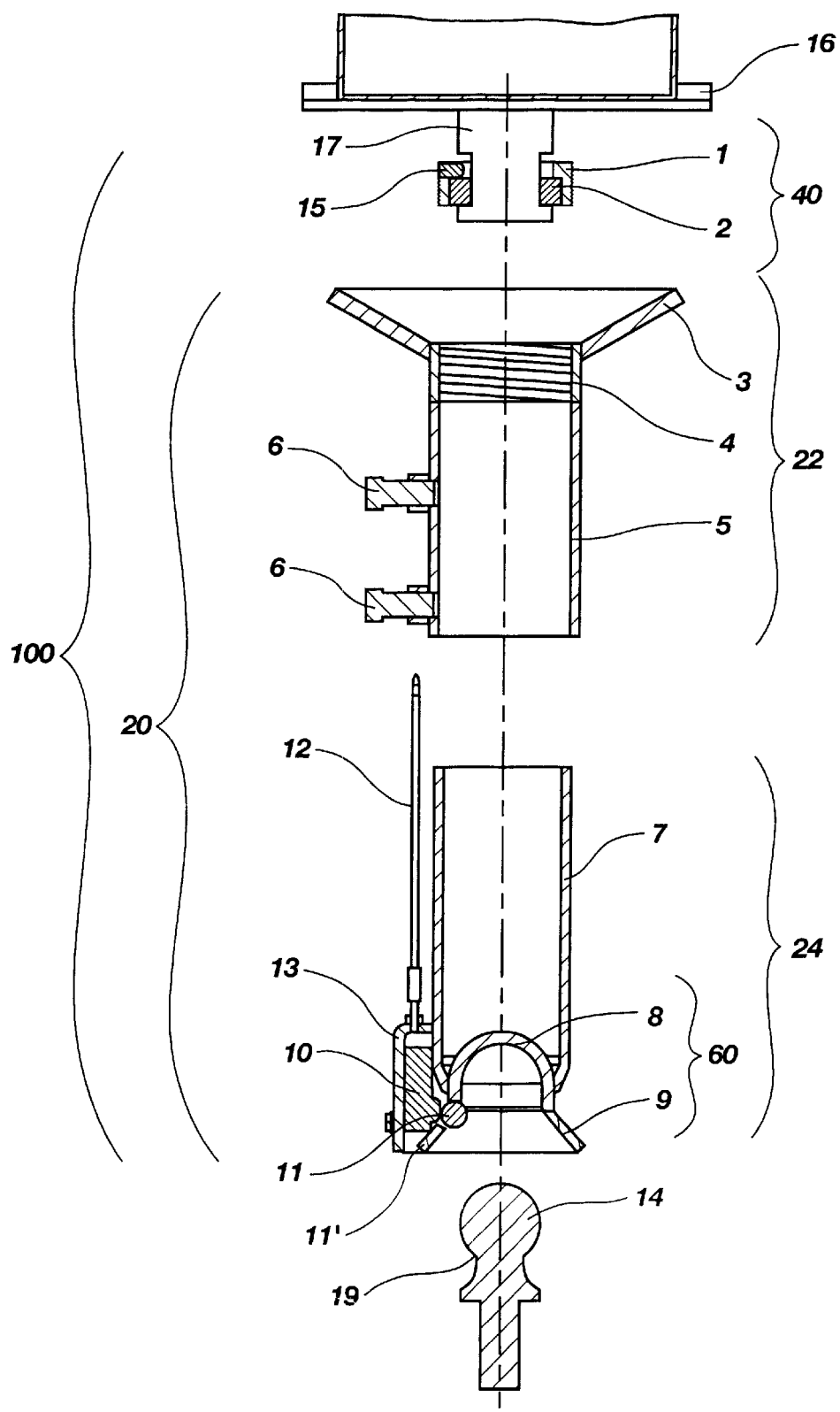
FIG. 1 is an exploded side view of a preferred embodiment of the component parts of the current invention in connection with a trailer having a king pin hitch and a towing vehicle having a standard ball hitch.

The current invention adapts any king pin style, fifth-wheel trailer king pin box 16 to attach to a standard ball hitch 14, such as a 25/16 inch standard ball hitch. FIG. 1 illustrates an exploded view of one embodiment of the adapter 100 of the current invention comprising a vertically adjustable body and a threaded collar assembly 40. In a preferred embodiment, the vertically adjustable body is a telescoping adapter body 20 with top half 22 and a bottom half 24. The top half 22 comprises a first mating sleeve 5 which is configured to fit over a second mating sleeve 7. The top of the first mating sleeve 5 comprises an internal threaded section 4 and a cone-shaped top 3.

The bottom half 24 comprises the second mating sleeve 7 and a latching mechanism. In one embodiment, the latching mechanism comprises wedge block 10, hardened latch pin 11, backup plate 13, linear cable actuator 12 housing cable 34, cable bracket 18, and handle 30 for activating and releasing the latching mechanism (shown in FIG. 2). The bottom of the second mating sleeve 7 houses a ball coupler assembly 60.

The first mating sleeve 5 and second mating sleeve 7 are held together by one or more set screws 6 to form the adapter body 20. By telescoping the mating sleeves 5, 7, the current invention allows several inches of vertical adjustment of length of the adapter body 20. Preferably, vertical adjustment of at least three inches is available. By loosening the set screws 6, adjusting the mating sleeves 5, 7, and then resetting the set screws 6, the user can manipulate the adapter 100 to provide greater or lesser clearance between the side-boards of the bed of the truck and the trailer overshot. The vertical adjustment feature also permits the user to level the trailer with respect to the ground, providing for better towing.

The ball coupler assembly 60 comprises a top portion 8 and a bell-shaped opening 9 for mating with a standard ball hitch 14 of a towing vehicle. At the junction of top portion 8 and bell-shaped opening 9 is a milled slot that is configured to receive the hardened latch pin 11. With prior art hitches, it is difficult to couple the trailer hitch to a standard ball hitch 14 because of the necessity to very accurately align the standard ball hitch 14 and the coupling apparatus. The bell-shaped opening 9 of the adapter 100 of the current invention allows the user to be off center, typically two or more inches off center, and still mate the adapter 100 and the standard ball hitch 14 without needing to jockey the truck around to achieve proper alignment for hookup.

In one embodiment of the latching mechanism of the current invention, a hardened latch pin 11 rides against the shoulder 19 of the standard hitch ball 14 to prevent the adapter body 20 from coming off the standard ball hitch 14. The hardened latch pin 11 is held in the locked position by a wedge block 10 which, when in the down position, prevents the hardened latch pin 11 from disengaging from its locked position under the shoulder 19 of the standard ball hitch 14. The hardened latch pin 11 is held captive in a milled slot 11' in the side of the ball coupler assembly 60 (FIG. 1). The milled slot has a contoured shape matching the radius of the hardened latch pin 11.

Figure 2:
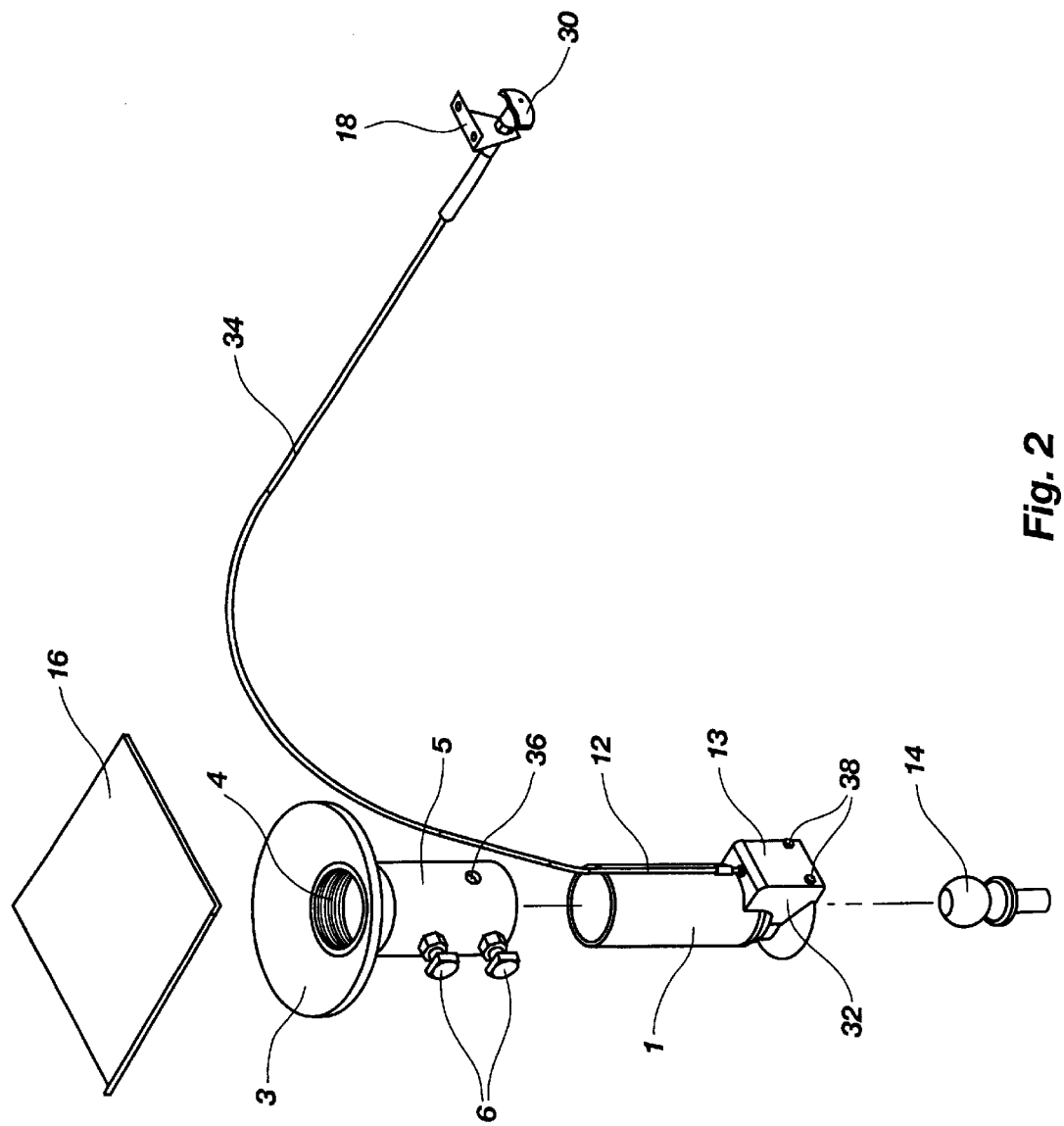
FIG. 2 is an exploded view of a preferred embodiment of the current invention.

FIG. 2 illustrates one of two opposing side plates 32 which are welded to the ball coupler assembly 60 on either end of the hardened latch pin 11 (not visible in FIG. 2) and on either side of the wedge block 10 (not visible in FIG. 2). The side plates 32 laterally secure the wedge block 10 and have bolt holes, or apertures, to accept the bolts 38 holding the backup plate 13 in place.

Referring to FIG. 1, the wedge block 10 is held in place against the hardened latch pin 11 by the backup plate 13. The backup plate 13 is bolted to the welded assembly of the ball coupler assembly 60 and the linear cable actuator 12. The wedge block 10 is locked in the down position by a twistlock mechanism that is activated by a handle 30 located at the opposite end of the linear cable actuator 12 (FIG. 2). The handle 30 is preferably located remote from the ball coupler assembly 60. When the handle 30 on the end of the cable 34 is pulled, the wedge block 10 is raised and the hardened latch pin 11 is allowed to roll away from the standard ball hitch 14, thus allowing the adapter body 20 to be raised off the standard ball hitch 14 for disengagement from the towing vehicle.

Figure 5:
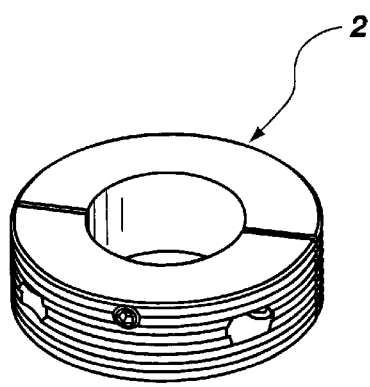
FIG. 5 is a view of an embodiment of the split collar of the present invention.

Installation of the adapter 100 is a simple process in which the adapter body 20 is connected to the trailer king pin 17 of the trailer king pin box 16. An experienced installer can install the adapter 100 in less than ten minutes. For ease of installation, the top half 22 can be separated from the bottom half 24. FIGS. 1 and 5 illustrate the components of the current invention including the threaded collar assembly 40 comprising a split collar 2 and a threaded collar 1. The threaded collar 1 is slid onto the trailer king pin 17.

In the preferred embodiment, an anti-seize grease is applied to the threads of the split collar 2 so that the adapter body 20 may be removed at a later date if desired. The split collar 2 is made of two halves (FIG. 5) so the split collar 2 can be fitted around the recessed annular groove of any trailer king pin 17. One side of each of the split collar halves has a chamfer and the chamfer side of the split collar halves faces downward when the collar halves are placed around the trailer king pin 17 and over the threaded collar 1. The two halves of the split collar 2 are matched around the trailer king pin 17. The split collar 2 is secured with Allen head studs that are introduced through a first collar half into a second collar half (not shown).

After the split collar 2 is installed in the groove of the trailer king pin 17, the threaded collar 1 is slid down over the split collar 2 and the set screw 15 is tightened against the trailer king pin 17 to prevent the threaded collar assembly 40 from rotating when the top half 22 is threaded and tightened on the threaded collar assembly 40 (FIG. 1).

Figure 4:
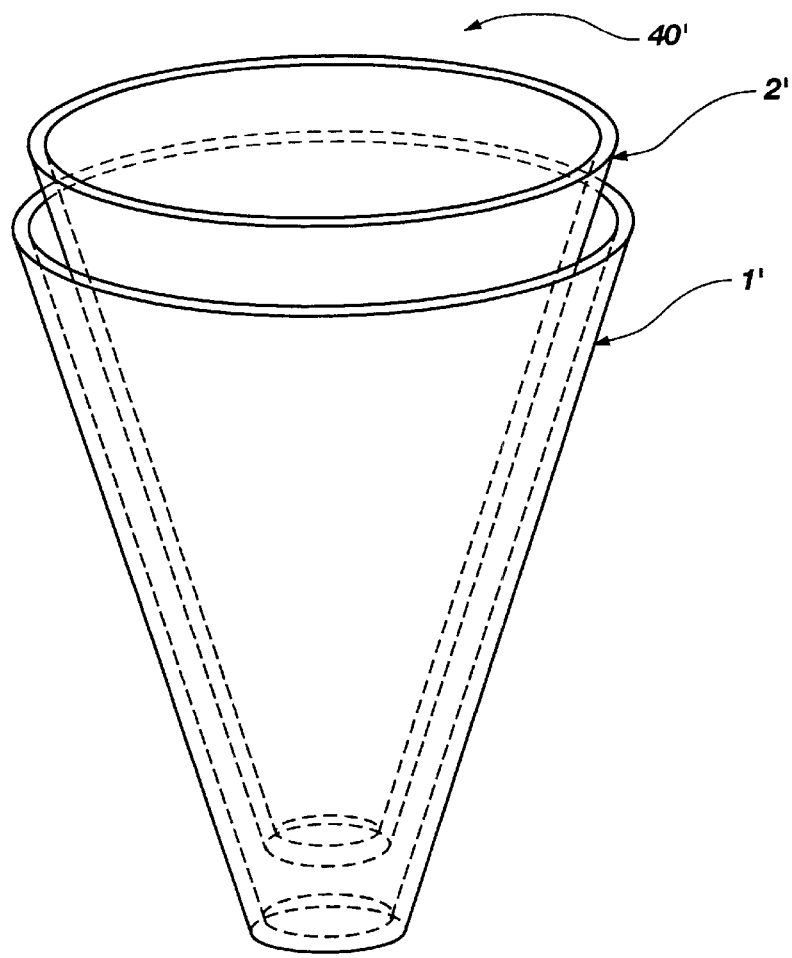
FIG. 4 is a perspective view of one embodiment of the threaded collar assembly.

FIG. 4 shows another preferred embodiment of the threaded collar assembly 40'0 wherein the threaded collar 1' is bored to the same internal diameter as the minor outer diameter of the annular groove of the trailer king pin 17 and is machined to a locking taper on the outer diameter. The locking taper is similar to a morse taper, or cone within cone design, used with a drill bit or to the taper of a split collar used with machinery to lock a sprocket or pulley to a shaft (FIG. 4). The tapered collar 2' comprises two equal 180 degree segments which allow the tapered collar 2' to collapse to a gripping fit around the neck of the trailer king pin 17 the same way a collet is designed to grip the shank of a tool.

The threaded collar 1' is bored to a matching taper to the tapered collar 2' outer diameter so as to slide down over the tapered collar 2', thus locking the threaded collar 1' around the neck of the trailer king pin 17 with adequate gripping force to prevent the threaded collar assembly 40' from turning while installing the adapter body 20.

To install the threaded collar assembly 40', slide the threaded collar 1' up over the major diameter of the trailer king pin 17, insert the two halves of the tapered collar 2' around the throat section of the trailer king pin 17 and slide the threaded collar 1' down over the tapered collar 2'. The threaded collar 1' can either be driven down over the tapered collar 2' or pulled down with a wheel puller to mechanically lock the threaded collar 1' into place. The threaded collar 1' should be set with sufficient force to allow the necessary installation torquing of the top half 22 of the adapter body 20 as discussed herein.

After the threaded collar assembly 40 is secured to the trailer king pin 17, the top half 22 of the adapter body 20 is attached to the threaded collar assembly 40 by hand screwing the top half 22 onto the threaded collar assembly 40. The cone-shaped top 3 fits over the trailer king pin 17 and the internal threaded section 4 of the top half 22 of the adapter body 20 mates up to and screws onto the threaded collar assembly 40. In a preferred embodiment, the top edge or corner of the cone-shaped top 3 is slightly serrated and heat treated. The serrated corner of the cone-shaped top 3 bites into the softer steel of the trailer king pin box 16, allowing the adapter body 20 to lock onto the trailer king pin 17, much the same as a lock washer used with a bolt and nut assembly, and prevents rotation of the adapter body 20 under normal use. The serrated edge on the cone-shaped top 3 provides a stabilizing element between the trailer king pin box 16 and the adapter 100 and eliminates the need for gussets, which are normally necessary in prior art designs.

Typically, the top half 22 can be secured against the trailer king pin box 16 using a wrench to at least 1,200 ft/lbs to ensure that the adapter 100 transfers the load of the trailer directly to the standard ball hitch 14, and does not cause damage to the trailer or the towing vehicle due to excessive play. In a preferred embodiment, a commonly available wrench, such as a Spanner Wrench™, is used. A Spanner Wrench™ is a specially designed wrench that fits into a hole 36 (FIG. 2) in the first mating sleeve 5 and wraps around the top half 22 of the adapter body 20. A long pipe on the end of the wrench may be needed to achieve the 1,200 ft/lbs torque when tightening the top half 22 of the adapter body 20.

After the top half 22 is attached to the trailer king pin 17, the bottom half 24 of the adapter body 20 is reinserted into the top half 22. The adapter body 20 is set to the proper height to allow the trailer to adequately clear the side-boards of the towing vehicle's bed and the set screws 6 are tightened to 150 ft/lb.

Figure 3:
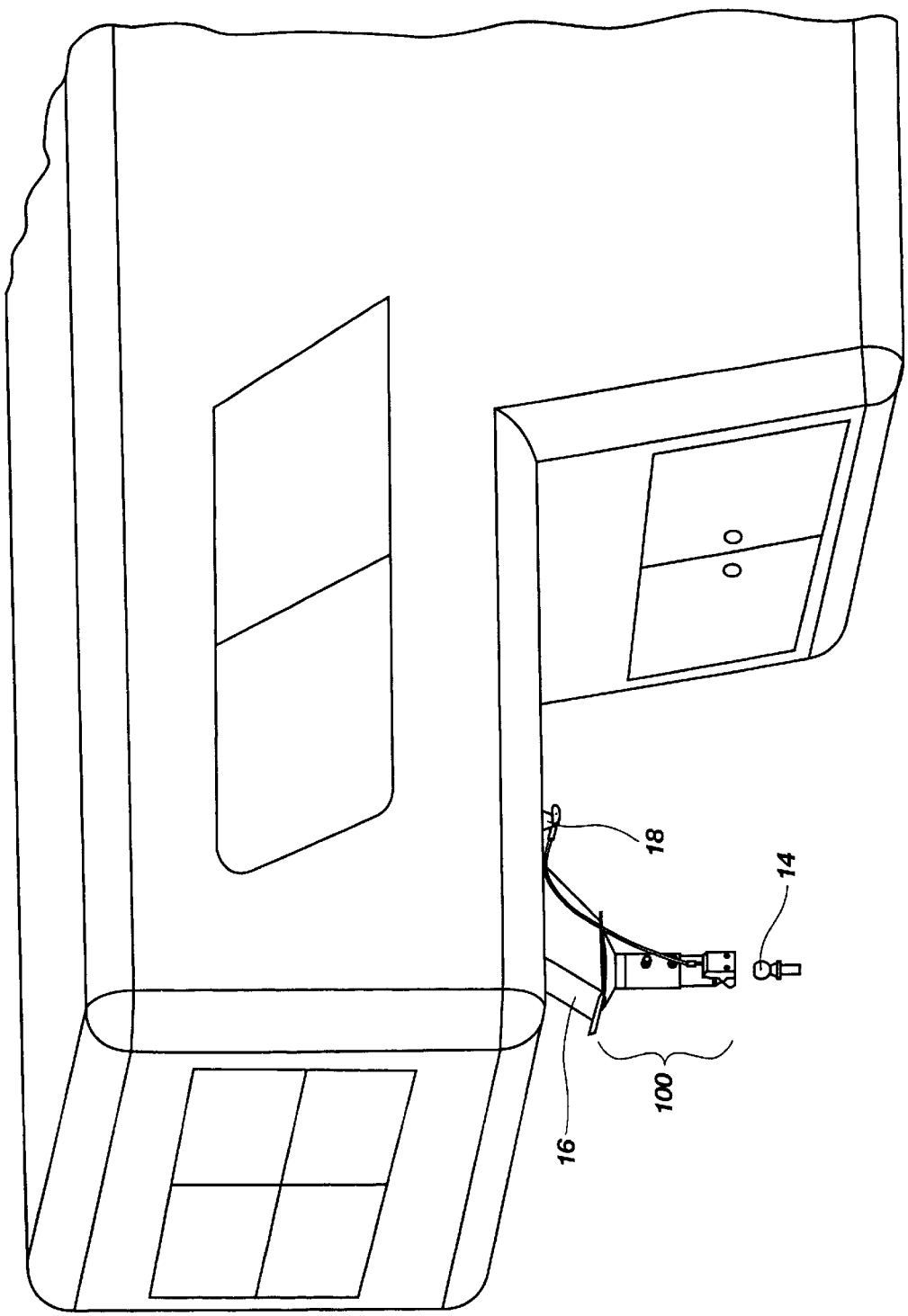
FIG. 3 is a partial perspective view of a preferred embodiment of the present invention attached to a trailer having a king pin hitch.

The cable bracket 18 is attached to the underside of the trailer's overshot (FIG. 3). In a preferred embodiment, the cable bracket 18 is attached with self-drilling, self-tapping screws within 24 inches of the centerline of the trailer. A cordless drill with a 5/16 inch socket is recommended for the easiest installation. The screws should be installed in the frame of the trailer, or the screws will eventually pull out of the thin fiberglass or aluminum sheet metal skin of the trailer. Installation of the cable bracket 18 within 24 inches of the centerline of the trailer prevents the cable 32 and cable bracket 18 from being crushed by the pickup's sideboards, which can happen when the trailer and the pickup become twisted in reference to each other on uneven surfaces as often found in campgrounds. Normally with a prior art fifth-wheel hitch, twisting would put tremendous strain on the frames of the truck and trailer because the fifth-wheel hitch prevented the truck and trailer from twisting in reference to each other.

If desired, the existing safety cable for the trailer's emergency disconnect brake is replaced with an extra-long safety cable. To replace the cable, the cable is crimped together with crimp sleeves. One end is attached to the trailer's emergency brake switch, and the other end is attached to the quick release snap. A stake pocket is located in the far upper corner of a pickup bed where a ¼ inch eye bolt can be installed. The quick release snap is attached to the ¼ inch eye bolt for the emergency disconnect brake cable.

When coupling the trailer to a prior art hitch, it is generally required to crawl into or reach into the truck bed to latch or unlatch the adapter locking mechanism. The current invention eliminates this practice with the combination of a linear cable actuator 12 and remote handle 30 located on the trailer at a convenient location where the user can latch or unlatch the hitch without the awkward problems the others present (FIG. 2).

Once the adapter 100 has been secured to the trailer king pin box 16 and the cable bracket 18 has been attached to the trailer frame, the trailer can be coupled to a standard ball hitch 14. The latching mechanism is locked by twisting and pushing the handle 30 in as far as it will go and then twisting the handle 30 to lock it in position.

To detach the adapter 100 from the standard ball hitch 14, the handle 30 is twisted, pulled out fully, and twisted again. This action raises the wedge block 10, thus releasing the hardened latch pin 11, and allows the ball coupler assembly 60 to fit over a standard ball hitch 14. The trailer is raised to clear the standard ball hitch 14, any wiring harnesses and safety cables are released, and the truck is driven out from under the trailer.

Other features and advantages of the present invention will become apparent to those of skill in the art through a consideration of the ensuing description, the accompanying drawings, and the appended claims.

What is claimed is:

1. A hitch adapter for coupling a first vehicle, having a king pin and king pin box, to a second vehicle with a ball hitch, said hitch adapter comprising:
   a threaded collar assembly for attaching to the king pin;
   a vertically adjustable body including a top with an internal threaded section, said internal threaded section configured to mate with the threaded collar assembly, and a bottom having a bell-shaped opening for receiving the ball hitch, said bell-shaped opening being larger than the ball hitch; and
   a latching mechanism coupled to the vertically adjustable body, said latching mechanism being operated by a handle located proximate the king pin.

2. The hitch adapter of claim 1, further comprising a milled slot on an exterior surface of the bell-shaped opening.

3. The hitch adapter of claim 2, wherein said threaded collar assembly comprises a split collar consisting of a first collar half and a second collar half wherein said first collar half and said second collar half are secured around the king pin.

4. The hitch adapter of claim 2, wherein said threaded collar assembly comprises a threaded collar and a tapered collar consisting of a first collar half and a second collar half wherein said first collar half and said second collar half are secured around the king pin.

5. The hitch adapter of claim 2, wherein said vertically adjustable body comprises a pair of mating sleeves.

6. The hitch adapter of claim 5, wherein said pair of mating sleeves is held together by at least one screw.

7. The hitch adapter of claim 2, wherein said vertically adjustable body can be lengthened by about three inches.

8. The hitch adapter of claim 2, wherein said top is cone-shaped and fits over the king pin.

9. The hitch adapter of claim 8, wherein said top has serrated edges.

10. The hitch adapter of claim 1, wherein said latching mechanism comprises:
   a latch pin, said latch pin being configured to ride against a shoulder of the ball hitch;
   a positive wedge block for securing said latch pin against the shoulder of said ball hitch and for preventing said latch pin from disengaging from the ball hitch;
   two opposing side plates attached to the bottom of the vertically adjustable body on either side of the latch pin and the wedge block;
   a backup plate attached to the two side plates, said backup plate for securing the wedge block against the latch pin; and
   a linear cable actuator housing a cable, said cable being attached at one end thereof to the wedge block and at another end thereof to a handle, said handle for activating and releasing the latching mechanism, wherein said handle is located remote from said bottom of said vertically adjustable body.

11. The hitch adapter of claim 10, wherein said latching mechanism further comprises a cable bracket mounted within 24 inches of a centerline of the first vehicle.

12. The hitch adapter of claim 10, wherein said latch pin rests in a milled slot in an exterior surface of the bottom of the vertically adjustable body.

13. The hitch adapter of claim 12, wherein the latch pin has a radius and said milled slot has a contoured shape matching the radius of the latch pin.

14. A method of coupling a first vehicle with a king pin and king pin box mounted thereon to a second vehicle with a ball hitch, said method comprising:
   attaching a threaded collar assembly to the king pin;
   screwing a vertically adjustable body onto the threaded collar assembly, said vertically adjustable body comprising a first end having a slightly serrated top and an internal threaded section and a second end having a bell-shaped opening for receiving the ball hitch;
   adjusting the vertically adjustable body to a height;
   aligning the bell-shaped opening within about two inches of a center of the ball hitch;
   coupling the vertically adjustable body to the ball hitch; and
   remotely activating a latching mechanism.

15. The method of claim 14, wherein attaching the threaded collar assembly comprises:
   placing two halves of a split collar around the king pin;
   securing the two collar halves to each other; and
   securing the split collar against the king pin.

16. The method of claim 14, wherein attaching the threaded collar assembly comprises:
   sliding a threaded collar over a major diameter of the king pin;
   inserting a tapered collar having two halves around the king pin; and
   sliding the threaded collar down over the tapered collar.

17. The method of claim 14, further comprising applying anti-seize grease to the threaded collar assembly before screwing the vertically adjustable body to the threaded collar assembly.

18. The method of claim 14, wherein screwing the vertically adjustable body onto the threaded collar assembly is effected with a force of at least 1,200 ft/lbs.

19. The method of claim 14, wherein screwing the vertically adjustable body onto the threaded collar assembly comprises mating the internal threaded section with the threaded collar assembly and allowing the slightly serrated top to bite into the king pin box.

20. The method of claim 14, wherein remotely activating the latching mechanism comprises manipulating a handle on an end of a cable, said handle being located proximate said first vehicle.

21. A hitch adapter for coupling any king pin to a ball hitch, said hitch adapter comprising:
   a threaded collar assembly for attaching to the king pin;
   a vertically adjustable stem including a first end with an internal threaded section and a top, said internal threaded section configured to mate with the threaded collar assembly and said top being cone-shaped, slightly serrated and heat treated, and a second end having a bell-shaped opening for receiving the ball hitch, said bell-shaped opening being considerably larger than the ball hitch; and
   a latching mechanism attached to the vertically adjustable stem, said latching mechanism being operated by a handle located proximate the king pin.

22. The hitch adapter of claim 21, wherein said slightly serrated top grips the king pin box.

23. The hitch adapter of claim 21, further comprising a milled slot on an exterior surface of the bell-shaped opening.

24. The hitch adapter of claim 21, wherein said threaded collar assembly comprises a split collar consisting of a first collar half and a second collar half wherein said first collar half and said second collar half are secured around the king pin.

25. The hitch adapter of claim 21, wherein said vertically adjustable stem comprises a pair of mating sleeves.

26. The hitch adapter of claim 25, wherein said pair of mating sleeves is held together by at least one screw.

27. The hitch adapter of claim 21, wherein said vertically adjustable stem can be lengthened by about three inches.

28. The hitch adapter of claim 21, wherein said latching mechanism comprises:
   a latch pin, said latch pin being configured to ride against a shoulder of the ball hitch;
   a positive wedge block for securing said latch pin against the shoulder of said ball hitch and for preventing said latch pin from disengaging from the ball hitch;
   two opposing side plates attached to a bottom of the vertically adjustable stem on either side of the latch pin and the wedge block;

a backup plate attached to the two side plates, said backup plate for securing the wedge block against the latch pin; and a linear cable actuator housing a cable, said cable being attached at one end thereof to the wedge block and at another end thereof to a handle, said handle for activating and releasing the latching mechanism wherein said handle is located remote from said bottom of said vertically adjustable stem.

29. The hitch adapter of claim 28, wherein said latch pin rests in a milled slot in an exterior surface of the second end of the vertically adjustable stem.

30. The hitch adapter of claim 29, wherein the latch pin has a radius and said milled slot has a contoured shape matching the radius of the latch pin.

31. The hitch adapter of claim 21, wherein the vertically adjustable stem provides sufficient clearance between a truck side-board and a trailer body.

32. A ranch hitch adapter kit comprising:

a hitch adapter including:
  a threaded collar assembly for attaching to a king pin;
  a vertically adjustable body having a bell-shaped opening for receiving a ball hitch, said bell-shaped opening being larger than the ball hitch; and
  a latching mechanism coupled to the vertically adjustable body, said latching mechanism comprising a linear cable actuator housing a cable, said cable being attached at one end thereof to a handle, said handle for activating and releasing the latching mechanism, and a cable bracket;

a spanner wrench, said spanner wrench adapted to secure the vertically adjustable body against the king pin.

33. The ranch hitch adapter kit of claim 32, wherein said latching mechanism further comprises:

a latch pin, said latch pin being configured to ride against a shoulder of the ball hitch;

a positive wedge block for securing said latch pin against the shoulder of said ball hitch and for preventing said latch pin from disengaging from the ball hitch;

two opposing side plates attached to a bottom of the vertically adjustable body on either side of the latch pin and the wedge block; and a backup plate attached to the two side plates, said backup plate for securing the wedge block against the latch pin.

34. The ranch hitch adapter kit of claim 32, further comprising self-drilling, self-tapping screws for attaching the cable bracket to a vehicle.

35. The ranch hitch adapter kit of claim 32, further comprising a safety cable kit having about five feet of cable, two crimp sleeves, a quick release snap, a ¼ inch eye bolt, two ¼ inch flat washers and two ¼ inch nuts.

36. The ranch hitch adapter kit of claim 32, wherein said threaded collar assembly comprises a split collar assembly, two studs and one set screw.

37. The ranch hitch adapter kit of claim 32, wherein said threaded collar assembly comprises a threaded collar and a tapered collar.

* * * * *